US 6,668,467 B2

(12) United States Patent
Shimomura et al.

(10) Patent No.: US 6,668,467 B2
(45) Date of Patent: Dec. 30, 2003

(54) SCALE MEMBER, METHOD OF PRODUCING THE SAME AND DISPLACEMENT MEASURING APPARATUS THEREWITH (75) Inventors: Toshitaka Shimomura, Kawasaki (JP); Atsushi Tominaga, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 265 days.

(21) Appl. No.: 09/907,771

(22) Filed: Jul. 19, 2001

(65) Prior Publication Data
US 2002/0014893 A1 Feb. 7, 2002

(30) Foreign Application Priority Data
Jul. 19, 2000 (JP) .......................... 2000-219434

(51) Int. Cl.$^7$ .................. G01B 11/22; G01B 11/12; G01B 11/02
(52) U.S. Cl. .................. 33/542; 33/706; 29/592.1; 29/595; 438/52
(58) Field of Search .................. 33/542, 706, 707, 33/708, 558, 561; 438/52, 53; 29/592.1, 595, 825; 324/622, 644, 699, 716, 207.11, 207.12, 207.13, 207.14, 207.15

(56) References Cited

U.S. PATENT DOCUMENTS

| 4,893,077 A | | 1/1990 | Auchterlonie |
| 5,209,131 A | * | 5/1993 | Baxter .................. 73/865.8 |
| 5,386,291 A | | 1/1995 | Sato et al. |
| 5,606,162 A | * | 2/1997 | Buser et al. .................. 250/306 |
| 5,727,326 A | * | 3/1998 | Mies et al. .................. 33/501.9 |
| 5,824,565 A | * | 10/1998 | Li et al. .................. 438/48 |
| 5,917,181 A | * | 6/1999 | Yoshizumi et al. .......... 250/230 |
| 6,060,336 A | * | 5/2000 | Wan .................. 438/50 |
| 6,074,890 A | * | 6/2000 | Yao et al. .................. 438/52 |
| 6,108,925 A | * | 8/2000 | Freitag .................. 33/706 |
| 6,426,538 B1 | * | 7/2002 | Knowles .................. 257/417 |
| 6,538,458 B2 | * | 3/2003 | Togashi et al. .................. 324/662 |

FOREIGN PATENT DOCUMENTS

| GB | 2 136 572 A | 9/1984 |
| JP | A 7-243867 | 9/1995 |

OTHER PUBLICATIONS

"Electrostatic Comb Drives" by Gregory T. A. Kovacs; Micromachined Transducers Sourcebook; published by WCB/Mcgraw–Hill; pp. 282–283, (date unknown).

* cited by examiner

Primary Examiner—Diego Gutierrez
Assistant Examiner—R. Alexander Smith
(74) Attorney, Agent, or Firm—Oliff & Berridge, PLC (57) ABSTRACT There is provided a displacement measuring apparatus efficiently productive and easily applicable to high precise measurement of displacement with contact probe detection for hardly-measurable works in the art such as micro-works and deep parts in complicated structures. A scale member includes a spindle and a scale both supported by a parallel leaf spring movable on a scale substrate. The spindle is arranged in coaxial with a measurement axis in the scale member. The L & S slit-processed scale is integrated with the spindle and supported by the parallel leaf spring to move together with the spindle along the measurement axis. The spindle, scale and parallel leaf spring are coupled to the scale substrate interposing an anchor of the parallel leaf spring therebetween. The spindle, scale and parallel leaf spring are formed in an integral structure and only the anchor contacts the scale substrate while the spindle, scale and parallel leaf spring slightly float from the scale substrate. A displacement sensor comprises a sensor substrate arranged opposite to the scale substrate. A light source and a photosensitive device are located on the sensor substrate.

11 Claims, 6 Drawing Sheets

SCALE MEMBER, METHOD OF PRODUCING THE SAME AND DISPLACEMENT MEASURING APPARATUS THEREWITH

CROSS REFERENCE TO RELATED APPLICATION

This application claims benefit of priority under 35 USC §119 to Japanese Patent Application No. 2000-219434, filed on Jul. 19, 2000, the entire contents of which are incorporated by reference herein.

BACKGROUND OF THE INVENTION

1. Field of the Invention

The present invention relates to a contact microdisplacement measuring apparatus applicable to high precise measurement of micro-works and hardly-measurable deep parts and productive with a low cost and high precision.

2. Description of the Related Art

Recent developments in micro-processing technologies such as micro-machining permit production of microstructures that have been impossible to produce by the conventional machining in the art and accordingly increase requirements for high precise measurement of micro-works.

In the conventional displacement measuring apparatus of contact type, however, a probe has an order-of-magnitude smaller size compared to a work to be measured and can not contact the work directly.

In addition, non-contact measuring methods such as a method using laser light are generally applied to works to which the contact measuring methods are hardly applied. The non-contact measuring methods, however, have the following problems:

(1) A spot diameter can not be adjusted easily smaller than the work; and
(2) As a light propagates in free space, they can not measure peripheries of a complicated structure that has an obstacle to shut a light path. The use of optical fibers can correspond to this problem but still remains the following problems:
(3) They require a complicated alignment among optical devices, have a low allowance over disturbance such as vibrations and temperature and moisture variations, and have a difficulty in high reliable and precise measurement; and
(4) They depend greatly on optical characteristics of the work (reflection coefficients, for example) and are of inferior general versatility.

SUMMARY OF THE INVENTION

The present invention has been made in consideration of such the problems and accordingly has an object to provide a displacement measuring apparatus, a scale member for use in the apparatus and a method of producing the scale member. The displacement measuring apparatus is efficiently productive and easily applicable to high precise measurement of displacement with contact probe detection for the above hardly-measurable works in the art such as micro-works and deep parts in complicated structures.

The present invention has another object to provide a displacement measuring apparatus using such the scale member.

According to the present invention, a scale member comprises a scale substrate; a spindle arranged in coaxial with a measurement axis for receiving a displacement input along the measurement axis; a scale displacing together with the spindle along the measurement axis; and a resilient support for supporting the spindle and scale on the scale substrate movable along the measurement axis. The spindle, scale, resilient support and scale substrate are formed integrally using fine patterning technologies.

The spindle, scale, resilient support and scale substrate may be formed integrally through photolithography and etching processes applied to a laminated substrate of Si—SiO$_2$—Si.

In the present invention, the spindle, scale, parallel leaf spring and scale substrate may be formed in an integral structure from a laminated substrate of Si—SiO$_2$—Si through fine patterning technologies such as photolithography and etching. Thus, a displacement measuring apparatus can be produced with a high precision for process sizes. The production using photolithography needs no mechanical alignment of the spindle and scale to the motion axis and requires relatively easy alignment to the sensor substrate. Because of micro-machining, very fine device structures can be produced. Such the micro-displacement measuring apparatus can perform high precise measurement of such parts that are hardly measured in the art.

The resilient support may comprise a parallel leaf spring coupled to the scale substrate interposing an anchor therebetween for supporting the spindle and scale in a state floating from the scale substrate.

Preferably, the scale substrate has a groove or a notch formed in the proximity of the spindle to avoid sticking during and after production processes.

A displacement measuring apparatus according to the present invention comprises the above scale member and a sensor for detecting a displacement of the scale of the scale member along the measurement axis.

Preferably, the sensor may include a sensor substrate and a detecting device mounted an the sensor substrate for detecting a displacement of the scale. The scale member couples to the sensor substrate interposing a spacer therebetween so that the scale oppositely spaces a certain gap from the detecting device.

Desirably, the spacer is formed integrally with the scale member. In this case, the spacer is bonded to the sensor substrate with an anodic bonding.

The sensor may comprise an optical sensor, including a light source for providing a light illuminating the scale and a photosensitive device for optically receiving a light from the scale, to configure an optical encoder together with the scale member.

The sensor may also comprise an induced current sensor to configure an induced current encoder together with the scale member.

The sensor may further comprise an induced current sensor to configure an induced current encoder together with the scale member.

The sensor may yet further comprise a magnetic sensor to configure a magnetic encoder together with the scale member.

According to the present invention, a method of producing a scale member comprises the steps of providing a laminated substrate including a first semiconductor substrate, a sacrifice layer and a second semiconductor substrate laminated in this order: performing a photolithography and anisotropic etching to the second semiconductor substrate to form portions to be the spindle, scale and resilient support linked together and a part of the resilient support extended wider than others; and performing an isotropic etching to the sacrifice layer to remove the sacrifice layer from beneath the spindle, scale and resilient support while remaining the sacrifice layer beneath the wider extended part of the resilient support.

Desirably, the method of producing the scale member according to the present invention may further comprises the stop of forming a spacer from a part of the second semiconductor substrate through a photolithography and anisotropic etching.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

A preferred first embodiment of the present invention will be described below with reference to the accompanying drawings.

Figure 1:
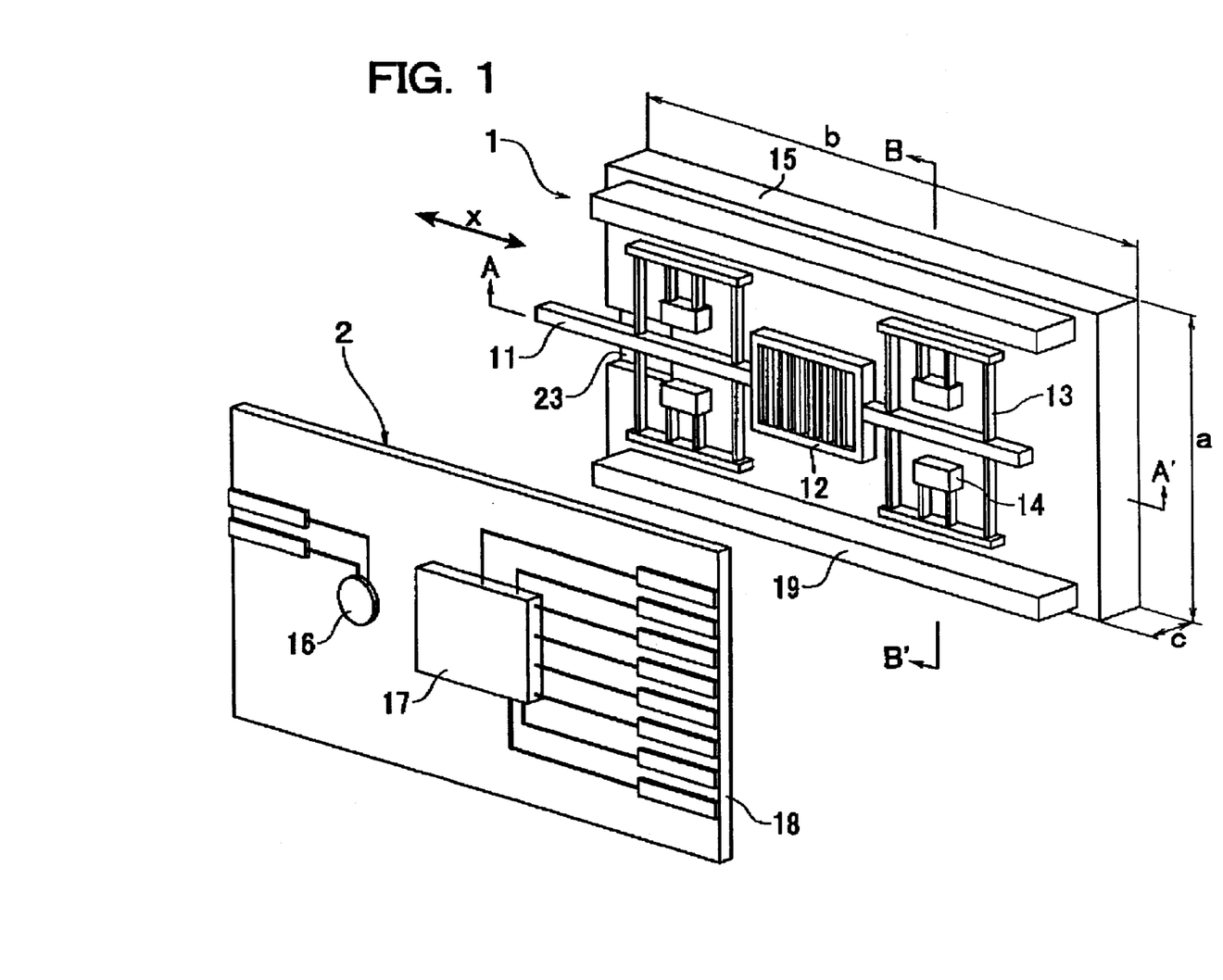
FIG. 1 is a perspective view illustrating a displacement measuring apparatus according to a first embodiment of the present invention.
Figure 2A:
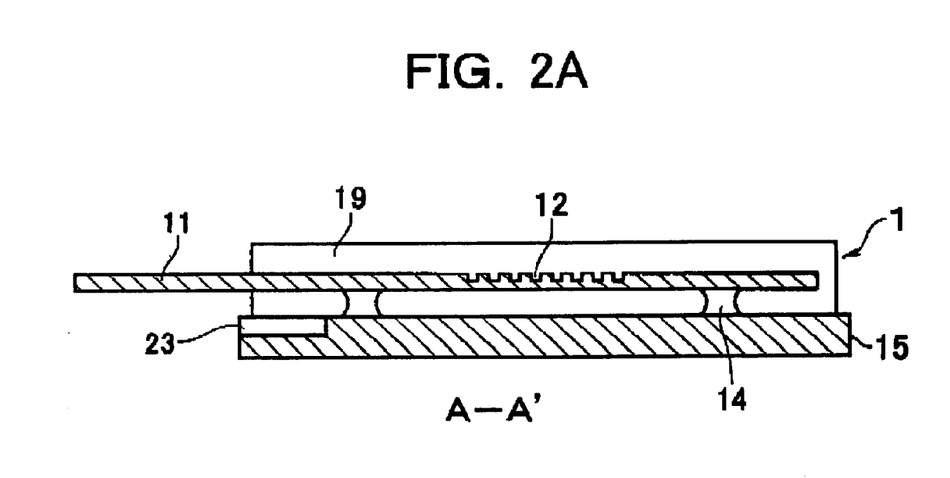
FIG. 2A is a cross-sectional view taken along A–A' in FIG. 1.
Figure 2B:
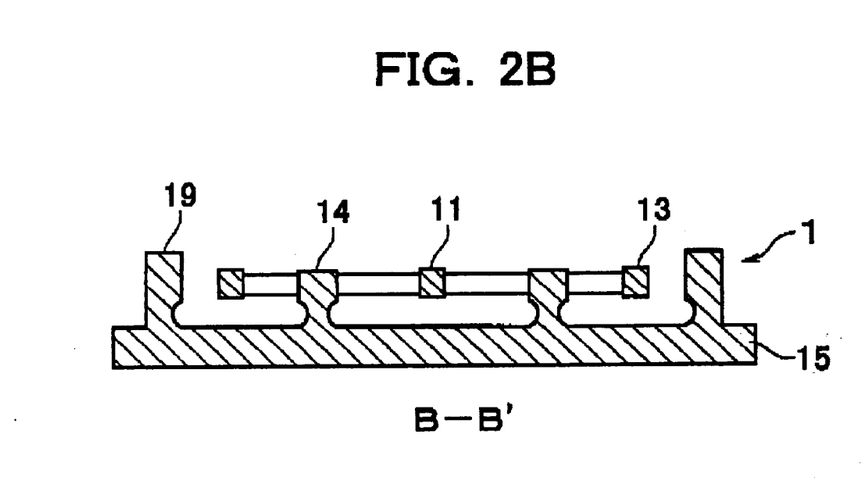
FIG. 2B is a cross-sectional view taken along B–B' in FIG. 1.

FIG. 1 is an exploded perspective view showing an arrangement of a displacement measuring apparatus according to the first embodiment of the present invention, FIG. 2A is a cross-sectional view taken along A–A' in FIG. 1 and FIG. 2B is a cross-sectional view taken along B–B' in FIG. 1.

This displacement measuring apparatus comprises a scale member 1 and a displacement sensor 2. The scale member 1 includes a spindle 11 and a scale 12, which are movably supported by resilient supports or parallel leaf springs 13 on a scale substrate 15. In the scale member 1 the spindle 11 is arranged in coaxial with a measurement axis x. The scale 12 is integrated with the spindle 11 and supported by the parallel leaf springs 13 so as to move together with the spindle 11 along the measurement axis x. The scale 12 has an L & S slit-processed surface. These spindle 11, scale 12 and parallel leaf springs 13 are coupled to the scale substrate 15 through anchors 14 of the parallel leaf springs 13. Accordingly, the spindle 11, scale 12 and parallel leaf springs 13 have an integral structure. Among the spindle 11, scale 12 and parallel leaf springs 13, other parts than the anchors 14 of the parallel leaf springs 13 do not contact the scale substrate 15 and slightly float from the scale substrate 15. On the other hand, the displacement sensor 2 comprises a glass, sensor substrate 18 arranged opposite to the scale substrate 15. A light source 16 and a photosensitive device 17 are arranged on the sensor substrate 18.

The scale substrate 15 and sensor substrate 18 have outer dimensions including a height of a=1 mm, length of b=2 mm and depth of c=0.5 mm. The scale substrate 15 is coupled to the sensor substrate 18 through a spacer 19 that is integrally formed with the scale substrate 15. This arrangement can hold a certain gap and parallel between both substrates 15 and 16 to prevent the spindle 11, scale 12 and parallel leaf springs 13 from interfering with the sensor substrate 18. In this embodiment the scale substrate 15 is bonded to the sensor substrate 18 with an anodic bonding through the spacer 19. The opposite arrangement of the scale member 1 and displacement sensor 2 thus configured can realize a reflective encoder.

A process of displacement detection in the displacement measuring apparatus of this embodiment will be described next. When the spindle 11 contacts a surface of a work to be measured, its displacement along the measurement axis x is obtained and input. As a result, the scale 12 integrated with the spindle 11 also displaces together with the spindle 11 along the measurement axis x.

A light radiated from the light source 16, reflected from slits on the surface of the scale 12 and received at the photosensitive device 17 is modulated with displacements of the scale 12. The modulated light is subjected to photoelectric conversion at the photosensitive device 17 and an output from the photosensitive device 17 is employed as a displacement signal. The received displacement signal may be operated by a computing device arranged on the sensor substrate 18 or may be processed by a computing apparatus located outside the displacement measuring apparatus.

The light source 17 on the displacement sensor 2, though it is located on the sensor substrate 18, may be located outside and a light therefrom may be introduced via an optical fiber, for example. The photosensitive device 16 may also be located on another location than the sensor substrate 18 and a light received at an optical fiber may be processed at a photosensitive device such as a photo-sensor located on the other location. Such the arrangement is advantageous because it can simplify the arrangement of the displacement sensor 2 and reduce influence of heat from the light source 16.

Figure 3A:
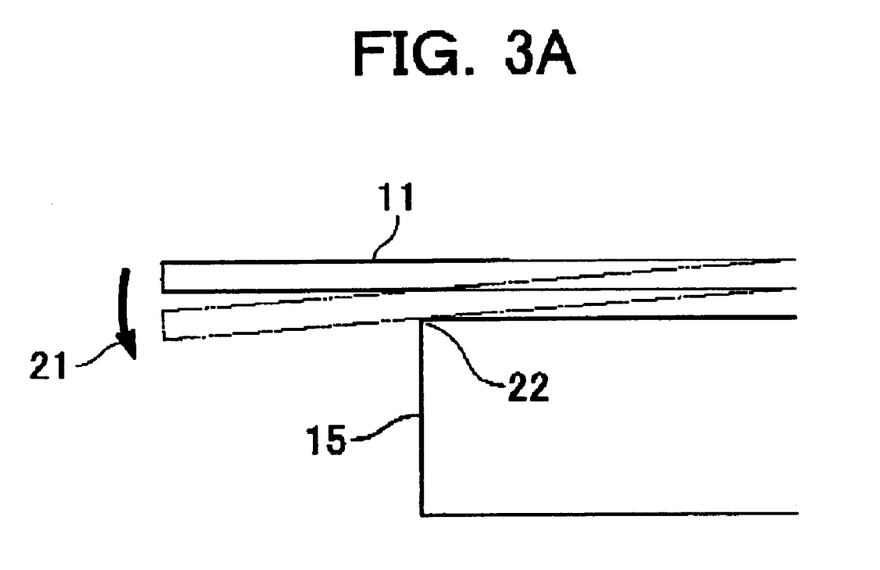
FIGS. 3A–B are magnified views of part of FIG. 2A.

FIG. 3 shows the tip of the spindle 11 in the A–A' cross-sectional view in FIG. 1. In such a structure as the displacement measuring apparatus according to this embodiment, an attractive force 21 can occur statically between the spindle 11 and the scale substrate 15. In this case, it expectedly causes sticking which forces the spindle 11 to contact a surface 22 of the scale substrate 15 as shown in FIG. 3A. If the spindle 11 contacts the scale substrate surface, the spindle loses its operability and the scale can not possibly provide its own functionality any more.

Figure 3B:
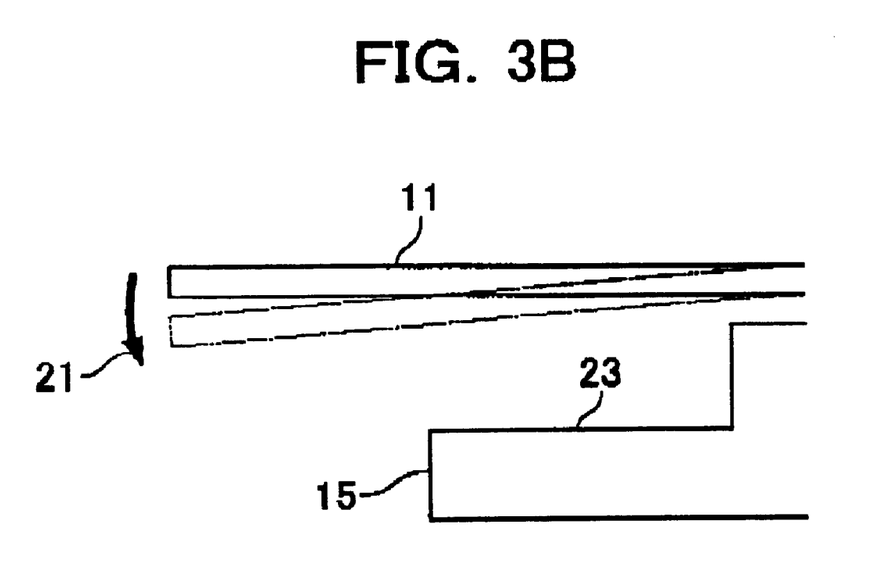
Figure 8:
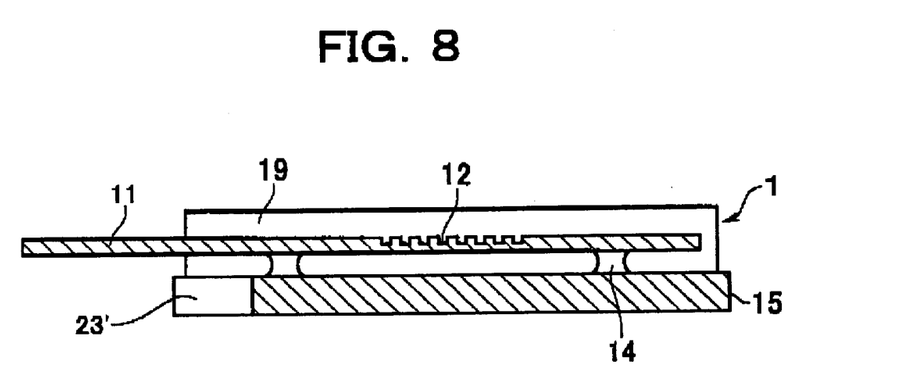
FIG. 8 is a cross-sectional view corresponding to FIG. 2A illustrating a displacement measuring apparatus according to another embodiment of the present invention.

For the purpose of reducing the attractive force, a groove 23 is formed on the scale substrate in the proximity of the spindle 11 as shown in FIG. 3B and FIG. 1 to locate the spindle 11 away from the scale substrate 15. This groove 23 can reduce the attractive force 21 and, even if the attractive force 21 acts intensively, prevents the spindle 11 from contacting the scale substrate 15. Desirably, as shown in FIG. 8, a notch 23' is formed on the scale substrate instead of the groove 23. The notch 23' can be formed by process from reverse side of the scale substrate.

Figure 4A:
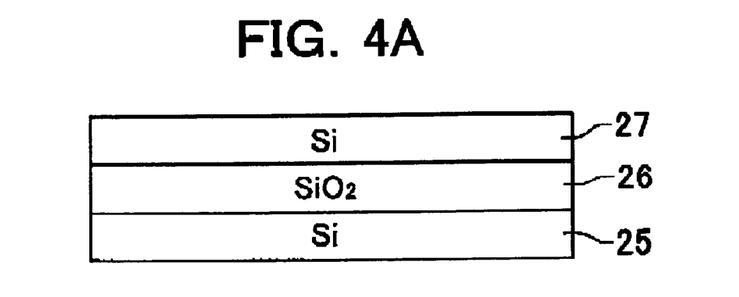
FIGS. 4A–D are cross-sectional views taken along B–B' in FIG. 1 for illustrating a process of producing a scale member according to the first embodiment of the present invention.
Figure 4B:
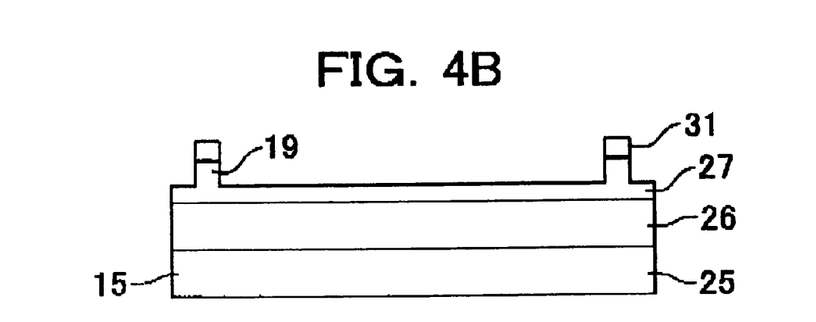
Figure 4C:
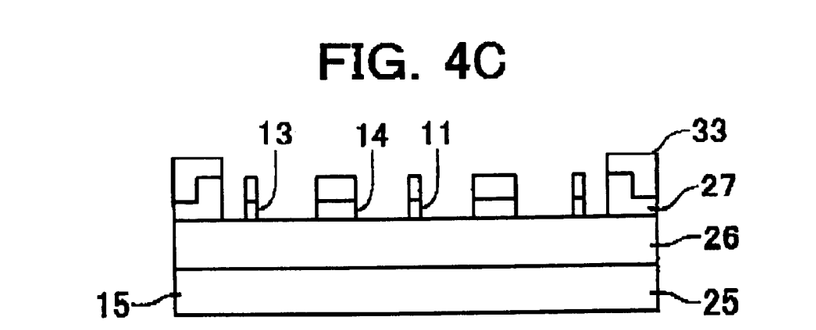
Figure 4D:
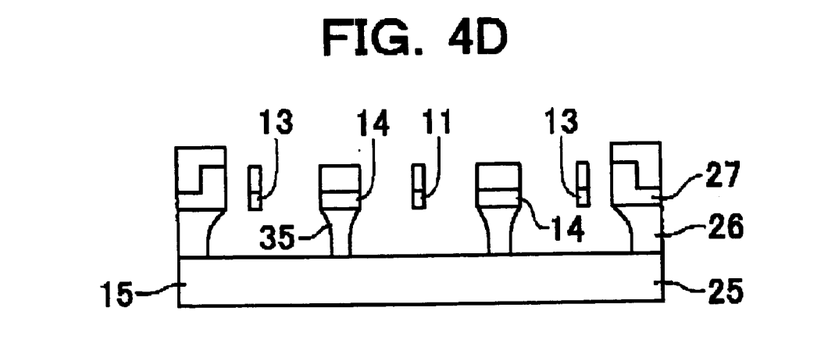

A method of processing the scale member 1 will be described next. FIGS. 4B–D show cross-sectional views in production processes taken along B–B' in FIG. 1.

The displacement sensor 2 has wiring patterns formed through photolithography/etching. To the contrary, the scale member 1 are formed through a process of etching a laminated substrate (SOI substrate) that includes a first Si substrate, a sacrifice layer 26 of $SiO_2$ and a second Si substrate 27 laminated as shown in FIG. 4A.

First, as shown in FIG. 4B, the second Si substrate 27 is subjected to an anisotropic etching by RIE using a resist mask 31 formed on parts corresponding to the above-described spacers 19. Next, as shown in FIG. 4C, the second Si substrate is subjected to an anisotropic etching using a resist mask 33 formed on the spindle 11, scale 12, parallel leaf springs 13 and anchors 14. In this stage, general outer shapes are formed for the spindle 11, scale 12, parallel leaf springs 13 and anchors 14 linked together. Finally, as shown in FIG. 4D, an isotropic etching is performed using a wet etching. At this moment, wider members such as the anchors 14 remain parts 35 of the $SiO_2$ sacrifice layer, even after the process of isotropic etching, which turn into junctions with the scale substrate 15. Specifically, in this case, the anchors 14 of the parallel leaf spring 13 correspond to the parts.

In contrast, narrower members such as the spindle lose the sacrifice layer from therebeneath and float above the first substrate without any contact with it.

The parallel leaf spring thus produced through the above processes has a function of restricting and buffering the direction of motion within resilient deformations of a beam.

The displacement measuring apparatus according to this embodiment is produced in a batch system. Therefore, it can be produced very small with high process precision and is suitable for mass production.

Furthermore, the motion axis of the spindle 11 can be completely coincident with the motion axis of the scale 12 at the stage of production by lithography. Such the high precise process eliminates the need for alignment between the scale substrate 15 and the sensor substrate 18 when they are laminated and can reduce the burden at the production stage.

A plurality of the scale members 1 integrated on a silicon wafer and a plurality of the displacement sensors 2 integrated on a silicon wafer can be aligned and laminated all together. Then the laminated silicon wafers are divided into a plurality of the displacement measuring apparatus. This process can further reduce the burden at the alignment and lamination stage for each displacement measuring apparatus.

In addition, such the very small displacement measuring apparatus has an advantage because it can easily measure such sites that have been very difficult to measure with the conventional measuring devices. Further, it has various applications as the following embodiments.

In the above embodiment a light emitted from the light source 16 is reflected at the scale 12 to configure a reflective encoder as a non-limitative example. Alternatively, a transparent material may be employed for the scale substrate 15.

In this case, if the light source 16 is arranged opposite to the photosensitive device 17 through the scale 12, a transmissible encoder can be configured, in which a light emitted from the light source 16 and transmitted through the scale 12 is received at the photosensitive device 17.

Alternatively, not limited in the above example, it is possible to configure encoders of induced current, electrostatic capacitance or magnetic type other than the photoelectric encoder of the above embodiment.

A displacement measuring apparatus according to a second embodiment of the present invention will be described next.

Figure 5A:
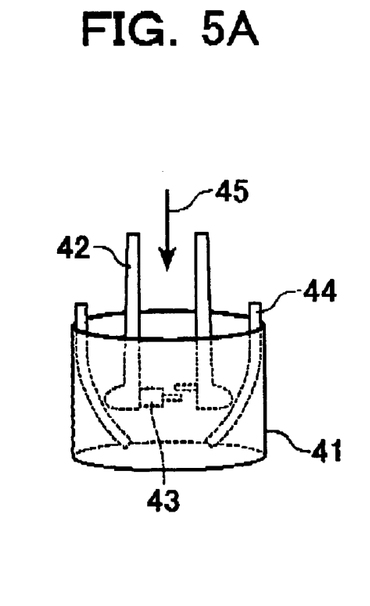
FIGS. 5A–B are views for illustrating a displacement measuring apparatus according to a second embodiment of the present invention.

FIG. 5 shows an application of the displacement measuring apparatus described in the first embodiment. The displacement measuring apparatus 43 in this embodiment is attached on the tip of an elongated stylus 42 to access even into a deep site when it measures a work such as a concave or cylindrical shape 41 as shown in FIG. 5A. It is further covered in a protection member 44 for protecting it from damages. Thus configured displacement measuring apparatus is inserted in the direction indicated with an arrow 45 to perform a measurement.

Figure 5B:
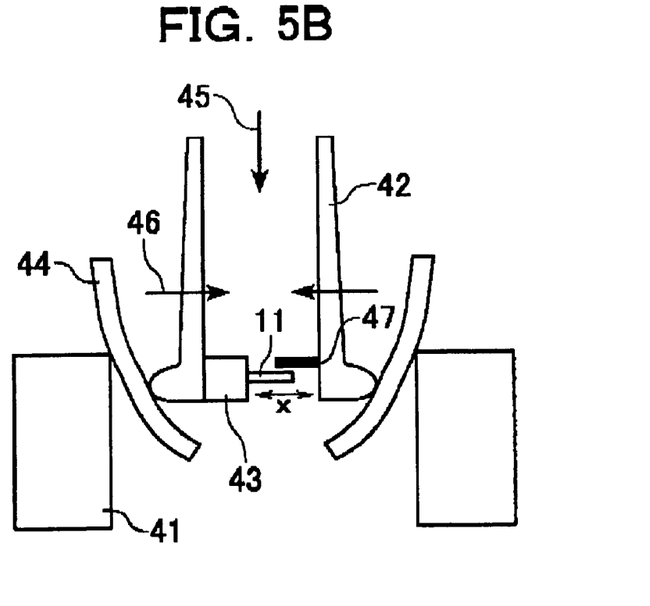

When the entire apparatus is inserted along the arrow 45, the protection member 44 moves along an arrow 46 as shown in the magnified view of FIG. 5B. At the same time, the stylus 42 in contact with the protection member 44 also moves along the arrow 46. As a result, the spindle 11 on the apparatus 43 is forcibly squeezed along the measurement axis x.

Through a series of operations that transmits the operation of the protection member 44 to the spindle 11, it is possible to measure dimensions of the work that is contact with the protection member 44.

The apparatus 43 is a very small structure that can be easily affected from impacts. Therefore, when an operator manually operates it in the apparatus arrangement shown in the figure, an excessive load works on the spindle and parallel leaf spring and possibly damages them.

For the purpose of suppressing the damage down to the minimum risk, a stopper 47 is then provided on the stylus 42 to inhibit the spindle 11 to squeeze beyond the allowed operation range.

As obvious from the forgoing, in the displacement measuring apparatus according to this embodiment, it has an order-of-magnitude smaller size compared to the conventional contact displacement measuring apparatus. Accordingly, it can be inserted effectively into a narrow space and it can perform high precise measurement to a work that is too small to perform contact measurement.

The displacement measuring apparatus according to this embodiment is applicable to various works other than the narrow apace.

A displacement measuring apparatus according to a third embodiment of the present invention will be described next.

Figure 6:
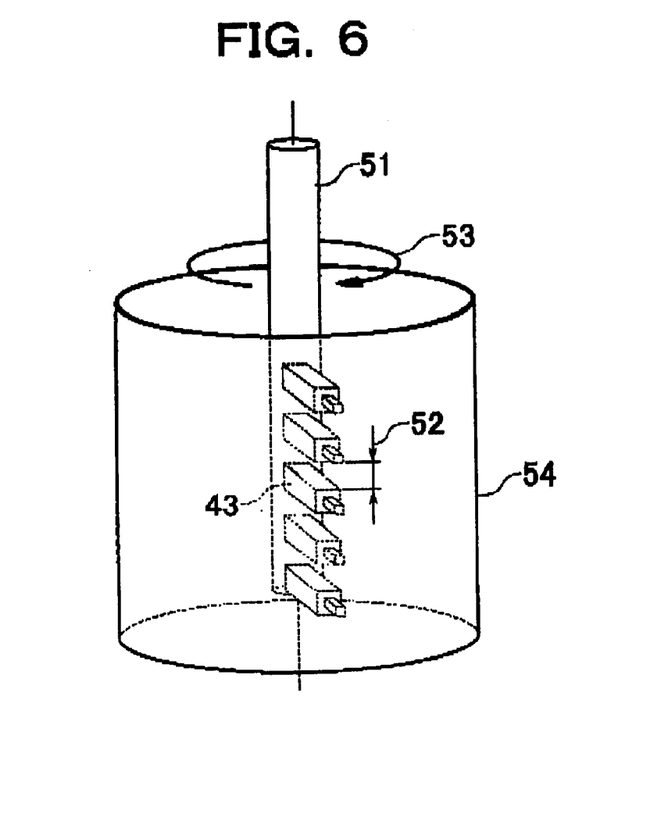
FIG. 6 is a view for illustrating a displacement measuring apparatus according to a third embodiment of the present invention.

FIG. 6 shows an arrangement of plural displacement measuring apparatus 43 arrayed on a member 51 at an interval 52. In this case, a work 54 has a cylindrical inner surface as shown in the figure. Then, profile measurement of the cylindrical inner surface of the work 54 can be performed when the member 51 is rotated along an arrow 53.

The array interval 52 can be set even to 1 mm, for example, because the apparatus 43 used are very small. The arrangement of many apparatus 43 arrayed at such the very small interval can achieve particularly fast and high precise profile measurements compared to measurements with a single contact in the art.

Also preferable in this embodiment, a protection member is added to protect the displacement-detecting spindle 11 from damages.

The displacement measuring apparatus according to this embodiment can perform fast profile measurements of various shapes such as a plane and a free curved plane other than the cylindrical inner surface.

A displacement measuring apparatus according to a fourth embodiment of the present invention will be described next.

Figure 7:
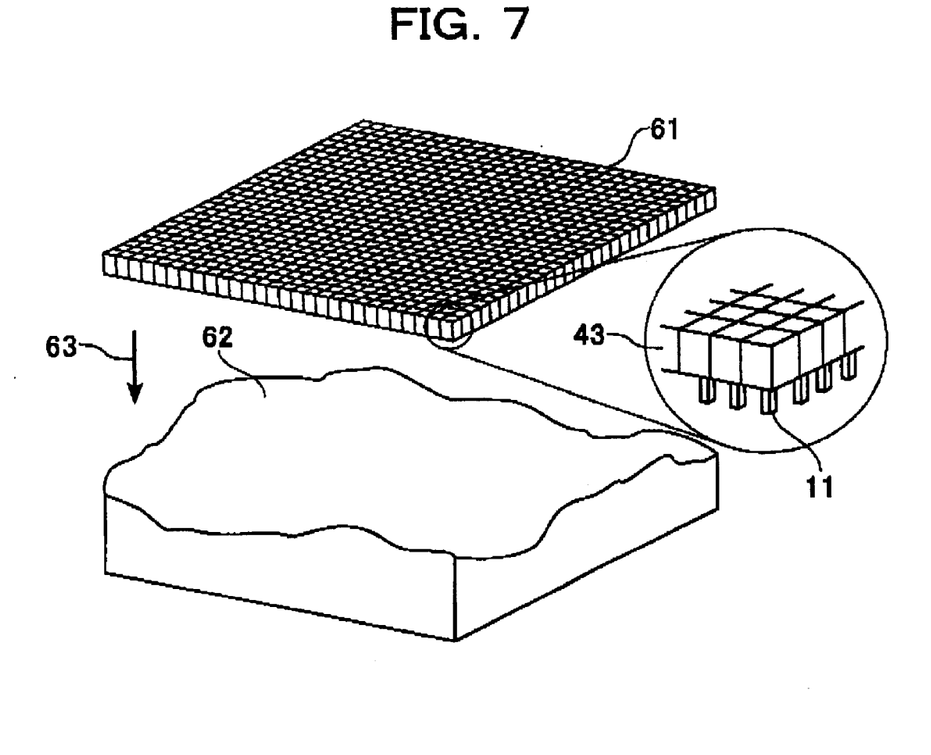
FIG. 7 is a view for illustrating a displacement measuring apparatus according to a fourth embodiment of the present invention.

In this embodiment, plural displacement measuring apparatus 43 are arranged in a checker pattern as an arrangement 61 shown in FIG. 7. The detailed arrangement of the displacement measuring apparatus 43 is shown in a magnified view in FIG. 7.

Moving the displacement measuring apparatus along an arrow 63 as shown in the figure, this arrangement can perform a faster and higher precise profile measurement of a free curved plane 62 compared to the prior art.

Also in this embodiment, a protection member can be added to protect the spindle 11 from damages to configure a more reliable displacement measuring apparatus.

As obvious from the forgoing, in the displacement measuring apparatus according to the present invention, the spindle, scale, parallel leaf spring and scale substrate may be formed in an integral structure from a laminated substrate of Si—SiO$_2$—Si through fine patterning technologies such as photolithography and etching. Thus, a displacement measuring apparatus can be produced with a high precision for process sizes. The production using photolithography needs no mechanical alignment of the spindle and scale to the motion axis and requires relatively easy alignment to the sensor substrate. Because of micro-machining, vary fine device structures can be produced, such the microdisplacement measuring apparatus can perform high precise measurement of such parts that are hardly measured in the art.

Having described the embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A scale member, comprising:
   a scale substrate;
   a spindle arranged coaxially alone a measurement axis for receiving a displacement input along said measurement axis;
   a scale displacing along said measurement axis, wherein the scale moves together with the spindle; and
   a resilient support for supporting said spindle and scale on said scale substrate, the resilient support movable along said measurement axis, wherein said spindle, scale, resilient support and scale substrate are formed integrally through photolithography and etching processes applied to a laminated substrate of Si—SiO$_2$—Si.

2. The scale member according to claim 1, wherein said resilient support comprises a parallel leaf spring that has an anchor, the parallel leaf spring being coupled to said scale substrate through the anchor for supporting said spindle and scale in a state floating from said scale substrate.

3. The scale member according to claim 1, wherein said scale substrate has a groove formed in a proximity of said spindle.

4. The scale member according to claims 1, wherein said scale substrate has a notch formed in a proximity of said spindle.

5. A displacement measuring apparatus, comprising:
   a scale member including
      a scale substrate,
      a spindle arranged coaxially along a measurement axis for receiving a displacement input along said measurement axis,
      a scale displacing along said measurement axis, wherein the scale moves together with said spindle, and
      a resilient support for supporting said spindle and scale on said scale substrate, the resilient support movable along said measurement axis, wherein said spindle, scale, resilient support and scale substrate are formed integrally using fine patterning technologies; and
   a sensor for detecting a displacement of said scale of said scale member along said measurement axis,
   wherein said sensor includes a sensor substrate, and a detecting device mounted on said sensor substrate for detecting a displacement of said scale, and wherein said scale member has a spacer and couples to said sensor substrate through the spacer so that said scale oppositely spaces a certain gap from said detecting device,
   wherein said space is formed integrally with said scale member, said spacer and said sensor substrate having an anodic bonding therebetween.

6. The displacement measuring apparatus according to claim 5, wherein said sensor comprises an optical sensor including a light source for providing a light illuminating said scale and a photosensitive device for optically receiving a light from said scale, the optical sensor being configured to form an optical encoder together with said scale member.

7. The displacement measuring apparatus according to claim 5, wherein said sensor comprises an electrostatic capacitance sensor configured to form an electrostatic capacitance encoder together with said scale member.

8. The displacement measuring apparatus according to claim 5, wherein said sensor comprises an induced current sensor configured to form an induced current encoder together with said scale member.

9. The displacement measuring apparatus according to claim 5, wherein said sensor comprises a magnetic sensor configured to form a magnetic encoder together with said scale member.

10. A method of producing a scale member, said member including:
    a scale substrate,
    a spindle arranged coaxially along a measurement axis for receiving a displacement input along said measurement axis,
    a scale displacing along said measurement axis, wherein the scale moves together with said spindle, and
    a resilient support for supporting said spindle and scale on said scale substrate, the resilient support movable along said measurement axis, wherein said spindle, scale, resilient support and scale substrate are formed integrally using fine patterning technologies,
    said method comprising:
       providing a laminated substrate including a first semiconductor substrate, a sacrifice layer and a second semiconductor substrate laminated in this order;
       performing a photolithography and anisotropic etching to said second semiconductor substrate to form por tions to be said spindle, scale and resilient support linked together and a part of said resilient support extended wider that others; and performing an isotropic etching to said sacrifice layer to remove a part of said sacrifice layer that is beneath said spindle, scale and resilient support while keeping another part of said sacrifice layer that is beneath said wider extended part of said resilient support.

11. The method of producing the scale member according to claim 10, further comprising the step of forming a spacer from a part of said second semiconductor substrate through a photolithography and anisotropic etching.

* * * * *